US010969981B2

(12) United States Patent
Ikeda

(10) Patent No.: US 10,969,981 B2
(45) Date of Patent: Apr. 6, 2021

(54) INFORMATION PROCESSING DEVICE AND INFORMATION PROCESSING METHOD

(71) Applicant: FUJITSU LIMITED, Kawasaki (JP)

(72) Inventor: Yuki Ikeda, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/654,064

(22) Filed: Oct. 16, 2019

(65) Prior Publication Data

US 2020/0159430 A1 May 21, 2020

(30) Foreign Application Priority Data

Nov. 21, 2018 (JP) .............................. JP2018-218380

(51) Int. Cl.
*G06F 3/06* (2006.01)
(52) U.S. Cl.
CPC ............ *G06F 3/0637* (2013.01); *G06F 3/061* (2013.01); *G06F 3/0622* (2013.01); *G06F 3/0635* (2013.01)
(58) Field of Classification Search
CPC .............................. G06F 3/0637; G06F 3/0622
USPC .......................................................... 711/163
See application file for complete search history.

(56) References Cited

U.S. PATENT DOCUMENTS 10,204,046 B1 * 2/2019 Peer ...................... H04L 9/3297
2001/0037435 A1 * 11/2001 Van Doren ......... G06F 12/0284
711/153

FOREIGN PATENT DOCUMENTS

JP          4-283838       10/1992
JP          2013-196066    9/2013

* cited by examiner

*Primary Examiner* — Jae U Yu
(74) *Attorney, Agent, or Firm* — Fujitsu Patent Center

(57) ABSTRACT

An information processing device includes a memory, and a processor configured to perform a first process configured to generate control data used in communication and storing the generated control data in a locked state in the memory while performing start processing of the first process, release the locked state of the control data in response to completion of the start processing or suspension of the start processing, and communicate with a communication device in response to a communication request, and perform a second process configured to determine, based on the control data, whether connection with the first process is established, when it is determined that the connection with the first process is not established, select processing for connecting with the first process in accordance with whether the control data in the memory is locked, and transmit the communication request to the first process while connecting with the first process.

9 Claims, 13 Drawing Sheets

US 10,969,981 B2

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2018-218380, filed on Nov. 21, 2018, the entire contents of which are incorporated herein by reference.

FIELD

The embodiments discussed herein are related to an information processing technology.

BACKGROUND

In order to realize communication with another device in a processing process of an application program, a process of a program for communication processing (which process will hereinafter be described as a "communication process") may be executed separately from the process of the application program. In this case, the communication process performs communication with the other device in response to a request from the process of the application program. According to such a configuration, when communication based on a new communication system is needed, for example, communication based on the communication system becomes possible by installing a program for executing a new communication process supporting the communication system.

As a technology related to this, the following file server is proposed. This file server includes an input/output (I/O) proxy daemon that performs, by proxy, issuance of an I/O request from a file server application section to a file system.

In addition, in relation to control of a process, the following process control method is proposed. In this process control method, the destruction of data due to the simultaneous update of same data is avoided by writing the identifying code of a process in a given file, executing the process on standby according to order of the identifying code, and deleting the identifying code of the process from the file after an end of the execution.

Related technologies are disclosed in Japanese Laid-open Patent Publication No. 2013-196066 and Japanese Laid-open Patent Publication No. 04-283838, for example.

SUMMARY

According to an aspect of the embodiments, an information processing device includes a memory, and a processor configured to perform a first process configured to generate control data used in communication and storing the generated control data in a locked state in the memory while performing start processing of the first process, release the locked state of the control data in response to completion of the start processing or suspension of the start processing, and communicate with a communication device in response to a communication request, and perform a second process configured to determine, based on the control data, whether connection with the first process is established, when it is determined that the connection with the first process is not established, select processing for connecting with the first process in accordance with whether the control data in the memory is locked, and transmit the communication request to the first process while connecting with the first process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the configuration that executes the communication process performing communication processing and the process requesting the communication process to perform the communication processing (the process requesting the communication process will hereinafter be described as a "requesting process") as described above, there may be a case where start processing of the communication process is begun in a state in which the requesting process is started. Therefore, when the requesting process requests the communication process to perform the communication processing, the start state of the communication process may assume a plurality of states such as a state during the start processing, a state in which the start processing is completed, a state in which the start processing is ended abnormally, and the like. The requesting process side is desired to continue processing without causing an error by selecting processing according to the start state of the communication process. However, it is difficult to make selection of such processing.

Figure 1:
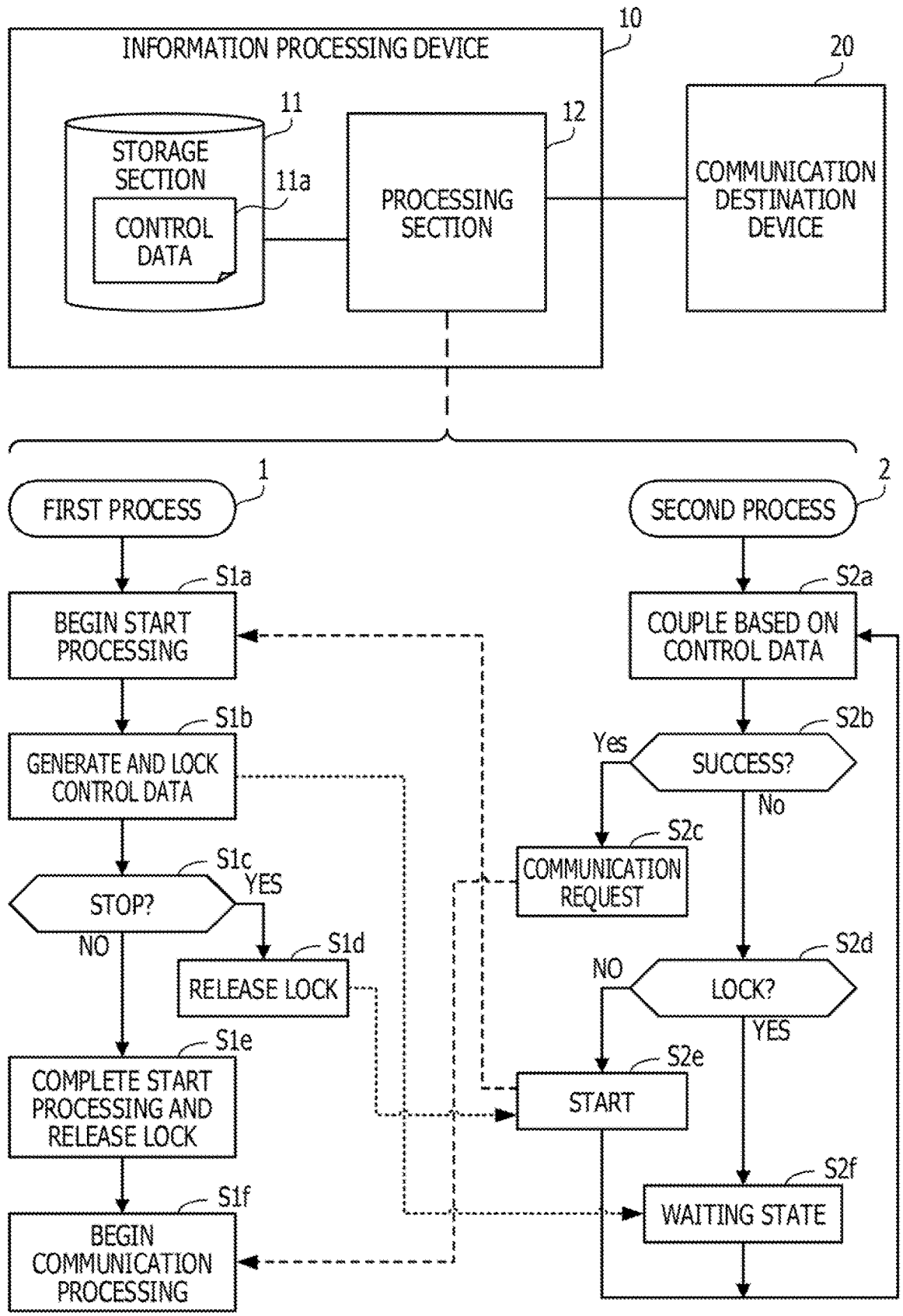
FIG. 1 is a diagram illustrating an example of a configuration of an information processing system according to a first embodiment and an example of processing.

An embodiment of the present technology will hereinafter be described with reference to the drawings. FIG. 1 is a diagram illustrating an example of a configuration of an information processing system according to a first embodiment and an example of processing. The information processing system illustrated in FIG. 1 includes an information processing device 10 and a communication destination device 20. In the information processing system, communication is performed between the information processing device 10 and the communication destination device 20.

The information processing device 10 includes a storage section 11 and a processing section 12. The storage section 11 is, for example, implemented by a storage area of a storage device, not illustrated, provided to the information processing device 10. The processing of the processing section 12 is, for example, implemented by a processor, not illustrated, provided to the information processing device 10, by executing a given program.

The storage section 11 stores control data 11$a$ generated by the processing section 12. The control data 11$a$ is data used in communication. The control data 11$a$, for example, includes the number of a communication port used when the processing section 12 communicates with the communication destination device 20 and the identification number of a communication process.

The processing section 12 executes a first process 1 and a second process 2. The first process 1 is a process that performs communication with the communication destination device 20 according to a communication request from the second process 2. The second process 2 is a process that makes the first process 1 communicate with the communication destination device 20 by transmitting the communication request to the first process 1. The second process 2 may thereby realize communication with the communication destination device 20 by using the first process 1.

The first process 1 performs processing as follows. The processing section 12 begins processing of starting the first process 1 (step S1$a$). In a process of performing the start processing, the processing section 12 generates the control data 11$a$ and stores the control data 11$a$ in the storage section 11, and locks the control data 11$a$ (step S1$b$). Suppose that the start processing proceeds without being stopped due to an abnormality or the like ("No" in step S1$c$), and that the start processing is completed. The processing section 12 releases the locking of the control data 11$a$ at a time of the completion of the start processing (step S1$e$). Then, the processing section 12 begins communication processing with the communication destination device 20 (step S1$f$). In this communication processing, the processing section 12 communicates with the communication destination device 20 according to a communication request from the second process 2. In addition, when the start processing is stopped midway due to an abnormality or the like, and is thus not completed normally ("Yes" in step S2$c$), the processing section 12 releases the locking of the control data 11$a$ (step S1$d$).

According to the first process 1 described above, the control data 11$a$ is locked while the start processing is performed normally. In addition, when the start processing is completed normally, the locking of the control data 11$a$ is released. Further, the locking of the control data 11$a$ is released also when the start processing is stopped midway due to an abnormality or the like.

On the other hand, in the second process 2, basically, the processing section 12 couples to the first process 1 based on the control data 11$a$, and transmits a communication request to the first process 1 in a state in which coupling to the first process 1 is established. The first process 1 thereby performs communication according to the communication request.

In addition, in the second process 2, the processing section 12 selects processing to be performed for the first process 1 in order to perform communication with the communication destination device 20 according to success or failure in coupling to the first process 1 based on the control data 11$a$ and a lock state indicating whether or not the control data 11$a$ is locked. The processing section 12 may determine a start state of the first process 1 from the success or failure in coupling to the first process 1 based on the control data 11$a$ and the lock state. As a result, the processing section 12 may select and perform appropriate processing according to a result of determination of the start state.

The second process 2 performs processing as follows, for example. The processing section 12 requests coupling to the first process 1 based on the control data 11$a$ (step S2$a$). When coupling to the first process 1 succeeds ("Yes" in step S2$b$), the processing section 12 transmits a communication request to the first process 1 (step S2$c$). The first process 1 thereby performs communication according to the communication request (step S1$f$).

When the coupling to the first process 1 fails ("No" in step S2$b$), on the other hand, the processing section 12 determines the lock state of the control data 11$a$ (step S2$d$). Here, when the control data 11$a$ is not locked ("No" in step S2$d$), it is determined that the processing of starting of the first process 1 is stopped midway due to an abnormality or the like. For example, this state corresponds to a state in which step S1$d$ is performed in the first process 1. In this case, the processing section 12 starts the first process 1 again (step S2$e$). The processing of starting the first process 1 is thereby started again (step S1$a$). When the start processing is completed normally, the processing section 12 in the second process 2 requests coupling to the first process 1 based on the control data 11$a$ (step S2$a$), and succeeds in the coupling ("Yes" in step S2$b$). Thus, communication using the first process 1 becomes possible.

In addition, when the control data is locked in step S2$d$, it is determined that the processing of starting the first process 1 is being performed. For example, this state corresponds to a state in which the start processing is continued after step S1$b$ is performed in the first process 1. In this case, the processing section 12 is set in a waiting state of waiting for the lock to be released, for example, for the start processing to be completed (step S2$f$). When the processing of starting the first process 1 is completed normally (step S1$e$), the processing section 12 recognizes that the start processing is completed by detecting a lock release, and requests coupling to the first process 1 based on the control data 11$a$ (step S2$a$). When the coupling succeeds ("Yes" in step S2$b$), communication using the first process 1 becomes possible.

Thus, in the second process 2, the processing section 12 may determine the present start state of the first process 1 from among a plurality of possible states of the first process 1 based on success or failure in coupling to the first process 1 based on the control data 11a and the lock state. In the above-described example, the processing section 12 may determine that the first process 1 is one of a state in the middle of the start processing, a state in which the start processing is completed, and a state in which the start processing is ended abnormally. The processing section 12 may therefore select and perform processing according to the determined start state. As a result, the second process 2 may continue processing for communicating with the communication destination device 20 without causing an error.

The processing of the information processing device 10 described above is effective particularly in a case where a plurality of second processes 2 are executed and the plurality of second processes 2 share one first process 1. For example, when one of the second processes 2 intends to perform communication in a state in which the first process 1 is not started, the second process 2 starts the first process 1. On the other hand, when another process of the second processes 2 intends to perform communication after the starting of the first process 1 is begun, the start state of the first process 1 may assume a plurality of states. For example, there may be a state in the middle of the start processing, a state in which the start processing is completed, and a state in which the start processing is ended abnormally. Hence, the other process may desirably select processing to be performed next after grasping the start state of the first process 1.

Accordingly, in the following description, a case will be illustrated as a second embodiment in which a plurality of second processes 2 are executed and these second processes 2 share one first process 1.

Figure 2:
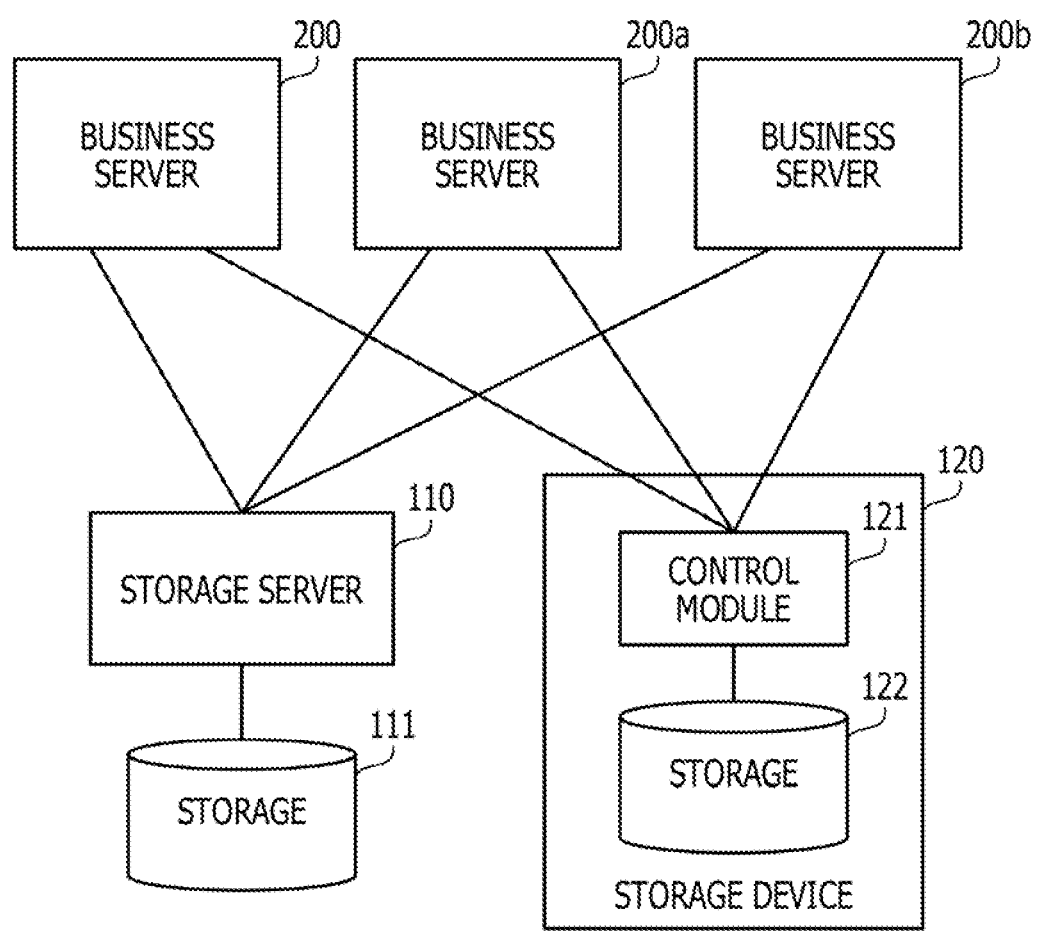
FIG. 2 is a diagram illustrating an example of a configuration of a storage system according to a second embodiment.

Next, description will be made of a storage system including the information processing device 10 illustrated in FIG. 1. FIG. 2 is a diagram illustrating an example of a configuration of a storage system according to the second embodiment. The storage system illustrated in FIG. 2 includes a storage server 110, a storage device 120, and business servers 200, 200a, and 200b. Incidentally, the business servers 200, 200a, and 200b are an example of the information processing device 10 in FIG. 1, and the storage server 110 is an example of the communication destination device 20 in FIG. 1.

A storage 111 is coupled to the storage server 110. The storage 111 includes one or a plurality of nonvolatile storage devices. The storage server 110 operates as a storage control device that controls access to the storage 111. Suppose in the present embodiment that the storage server 110 generates a logical volume using the storage device included in the storage 111, and controls access to the logical volume.

The storage device 120 includes a control module 121 and a storage 122. The storage 122 includes one or a plurality of nonvolatile storage devices. The control module 121 is a storage control device that controls access to the storage 122. Suppose in the present embodiment that the control module 121 generates a logical volume using the storage device included in the storage 122, and controls access to the logical volume.

Incidentally, hard disk drives (HDDs) and solid state drives (SSDs) may be used as the nonvolatile storage devices included in the storages 111 and 122. The business servers 200, 200a, and 200b are server computers that perform given business processing. In addition, in a process of the business processing, access is made to at least one of the logical volume generated by using the storage 111 and the logical volume generated by using the storage 122. The business servers 200, 200a, and 200b may access the logical volume generated by using the storage 111 via the storage server 110. In addition, the business servers 200, 200a, and 200b may access the logical volume generated by using the storage 122 via the control module 121.

Here, the storage device 120 is a dedicated device for storage access. Coupling between the control module 121 of the storage device 120 and the business servers 200, 200a, and 200b is made via a storage area network (SAN), for example. Communication between the control module 121 of the storage device 120 and the business servers 200, 200a, and 200b is performed by a communication system specialized in storage access.

On the other hand, the storage server 110 is provided with a storage control function by installing an application program on a general-purpose server computer. Coupling between the control module 121 of the storage server 110 and the business servers 200, 200a, and 200b is made via a local area network (LAN), for example. Communication between the storage server 110 and the business servers 200, 200a, and 200b is performed by a general-purpose communication system using a Web application programming interface (API). Suppose in the present embodiment that communication using a representational state transfer (REST) API is performed as an example of such a communication system. For example, the storage server 110 operates as a server of the REST API, and the business servers 200, 200a, and 200b operate as a client of the REST API.

Figure 3:
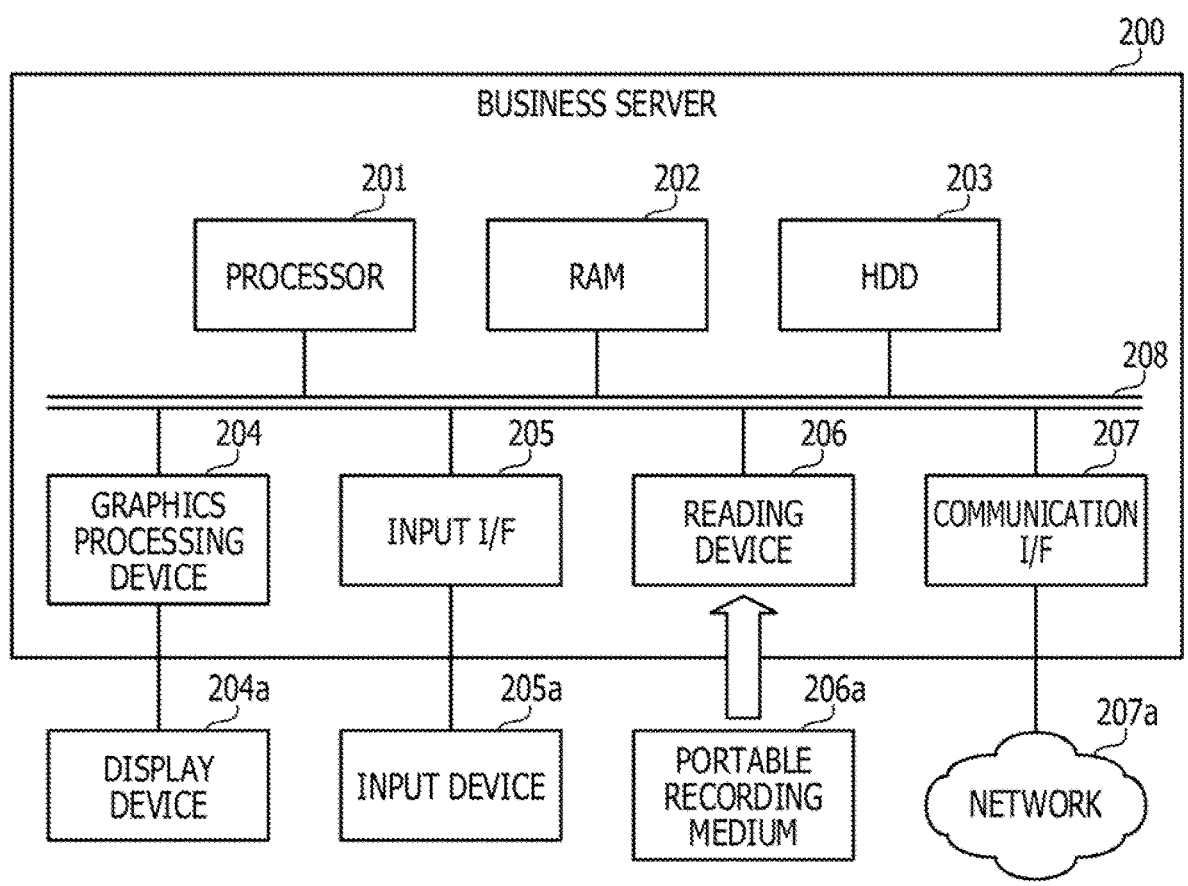
FIG. 3 is a diagram illustrating an example of a hardware configuration of a business server.

FIG. 3 is a diagram illustrating an example of a hardware configuration of a business server. FIG. 3 illustrates the business server 200 among the business servers 200, 200a, and 200b. The business server 200 is implemented as a computer as illustrated in FIG. 3, for example. The business server 200 illustrated in FIG. 3 includes a processor 201, a random access memory (RAM) 202, an HDD 203, a graphics processing device 204, an input interface (I/F) 205, a reading device 206, and a communication interface (I/F) 207.

The processor 201 collectively controls the whole of the business server 200. The processor 201 is, for example, a central processing unit (CPU), a micro processing unit (MPU), a digital signal processor (DSP), an application specific integrated circuit (ASIC), or a programmable logic device (PLD). In addition, the processor 201 may be a combination of two or more elements of the CPU, the MPU, the DSP, the ASIC, and the PLD.

The RAM 202 is used as a main storage device of the business server 200. The RAM 202 temporarily stores at least a part of an operating system (OS) program and an application program that the processor 201 is made to execute. The RAM 202 also stores various kinds of data needed for processing by the processor 201.

The HDD 203 is used as an auxiliary storage device of the business server 200. The HDD 203 stores the OS program, the application program, and various kinds of data. Incidentally, another kind of nonvolatile storage device such as an SSD or the like may also be used as the auxiliary storage device.

A display device 204a is coupled to the graphics processing device 204. The graphics processing device 204 displays an image on the display device 204a according to an instruction from the processor 201. The display device 204a includes a liquid crystal display, an organic electroluminescence (EL) display, and the like.

An input device 205a is coupled to the input interface 205. The input interface 205 transmits a signal output from the input device 205a to the processor 201. The input device 205a includes a keyboard, a pointing device, and the like. The pointing device includes a mouse, a touch panel, a tablet, a touch pad, a trackball, and the like.

A portable recording medium 206a is inserted into and removed from the reading device 206. The reading device 206 reads data recorded on the portable recording medium 206a, and transmits the data to the processor 201. The portable recording medium 206a includes an optical disk, a magneto-optical disk, a semiconductor memory, and the like.

The communication interface 207 transmits and receives data to and from another device via a network 207a.

Processing functions of the business server 200 may be implemented by the hardware configuration as described above. Incidentally, the business servers 200a and 200b may also be implemented as a computer of a hardware configuration as in FIG. 3. The storage server 110 and the control module 121 may also be implemented as a computer of a hardware configuration as in FIG. 3.

Next, description will be made of processing of the business servers 200, 200a, and 200b. The following description will describe the business server 200 among these business servers. However, the business servers 200a and 200b also have processing functions similar to those of the business server 200, and are able to perform similar processing.

Figure 4:
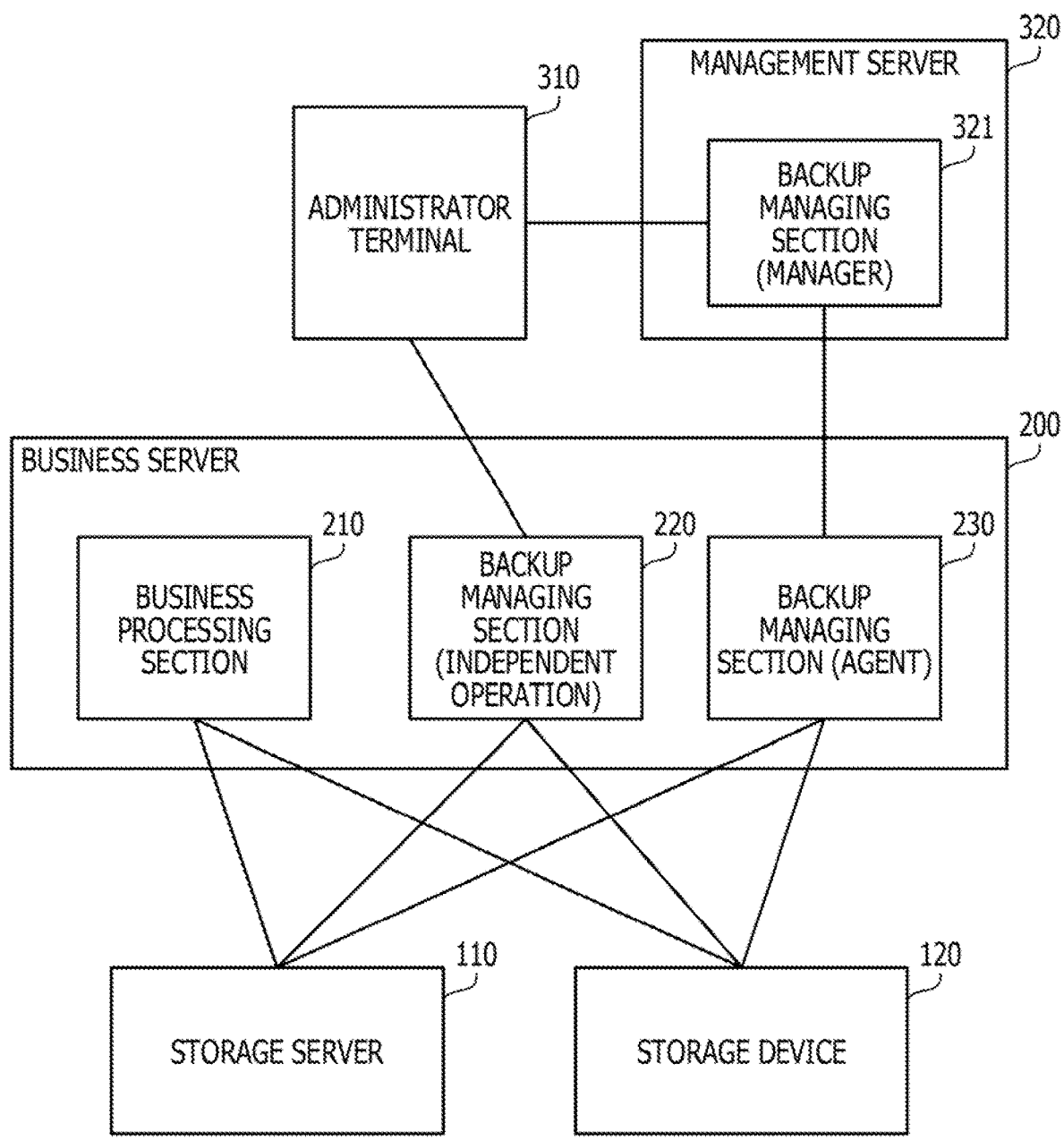
FIG. 4 is a diagram illustrating an example of a configuration of basic processing functions provided to a business server.

First, FIG. 4 is a diagram illustrating an example of a configuration of basic processing functions provided to a business server. The business server 200 includes a business processing section 210 and backup managing sections 220 and 230. The processing of the business processing section 210 and the backup managing sections 220 and 230 is, for example, implemented by the processor 201 possessed by the business server 200 by executing a given application program. In addition, an administrator terminal 310 and a management server 320 are coupled to the business server 200.

The business processing section 210 performs given business processing. At a time of performing the business processing, the business processing section 210 may access the logical volume generated by using the storage 111 via the storage server 110. In addition, at a time of performing the business processing, the business processing section 210 may access the logical volume generated by using the storage 122 via the control module 121 of the storage device 120.

The business processing section 210 is, for example, implemented by a virtual machine operating on the business server 200. A logical volume used for resources of the virtual machine (which logical volume will be described as a "high-level volume") is assigned and used from a storage pool implemented by a logical volume using at least one of the storages 111 and 122 (which logical volume will be described as a "low-level volume"). The resources of such a virtual machine include a virtual memory, a virtual disk, and the like.

The processing of the backup managing sections 220 and 230 is implemented by respective individual application programs. The backup managing sections 220 and 230 make the storage server 110 and the control module 121 perform various kinds of backup processing for the logical volumes. Such backup processing includes processing of copying all data of the logical volumes or difference data from a previous backup time to a backup volume, processing of copying the data of the logical volumes to the backup volume on a generation-by-generation basis by a copy-on-write method, replication processing of duplicating the data of the logical volumes to the backup volume in real time, and the like.

The backup managing section 220 operates singly, and makes the storage server 110 and the control module 121 perform the backup processing according to an operation of an administrator from the administrator terminal 310. In addition, the backup managing section 220 may make the backup processing performed for the low-level volume of the above-described logical volumes. For example, the backup managing section 220 may manage the logical volume backup processing with a level not associated with the processing of the business processing section 210 as an upper limit. Further, the backup managing section 220 may also specify the low-level volume assigned to any of the business servers 200, 200a, and 200b as a backup target.

On the other hand, the backup managing section 230 makes the storage server 110 and the control module 121 perform the backup processing under control of the backup managing section 321 possessed by the management server 320. The processing of the backup managing section 321 is implemented by a manager program for backup management. The processing of the backup managing section 230 is implemented by an agent program corresponding to the manager program. In addition, functions equivalent to those of the backup managing section 230 are implemented also in the business servers 200a and 200b by the agent program corresponding to the manager program. The backup managing section 321 of the management server 320 manages the backup processing related to the business servers 200, 200a, and 200b in an integrative manner.

For example, the management server 320 stores operation management information for each of the business servers 200, 200a, and 200b. The operation management information includes setting information indicating high-level volumes and low-level volumes assigned to the business servers 200, 200a, and 200b, respectively. The backup managing section 321 specifies the high-level volumes and the low-level volumes as targets of backup processing for the business servers 200, 200a, and 200b, and gives an instruction to perform the backup processing.

In response to the instruction from the backup managing section 321, the backup managing section 230 of the business server 200 instructs the storage server 110 or the control module 121 to perform the backup processing for the specified high-level volumes and the specified low-level volumes. The backup managing section 230 thereby mediates the instruction to perform the backup processing as an agent corresponding to the backup managing section 321 of the management server 320.

In addition, unlike the backup managing section 220, the backup managing section 230 may make the backup processing performed on the low-level volumes, and besides, the high-level volumes. For example, as compared with the backup managing section 220, the backup managing section 230 may manage the logical volume backup processing up to a higher level associated with the processing of the business processing section 210. However, the backup managing section 230 may specify only the logical volumes assigned to the business server 200 as a backup target.

In the business server 200, only one of such backup managing sections 220 and 230 may be operated, or both of the backup managing sections 220 and 230 may be operated simultaneously. For example, in the business server 200, only one of application programs respectively implementing the processing of the backup managing sections 220 and 230 may be executed, or both of the application programs may be executed simultaneously.

As described earlier, the storage device 120 is a dedicated device for storage access. The storage device 120 is coupled to the business server 200 via a SAN, for example, and performs communication with the business server 200 by using a communication system specialized in storage access. On the other hand, the storage server 110 is a general-purpose server computer. The storage server 110 is coupled to the business server 200 via a LAN, for example, and performs communication with the business server 200 by providing the REST API.

Suppose in the present embodiment that in addition to a function of communicating with the storage device 120, a function of communicating with the storage server 110 is newly added to the business server 200. Therefore, a client function for communicating with the storage server 110 operating as a server of the REST API is newly added to the business server 200. Each of the business processing section 210 and the backup managing sections 220 and 230 communicates with the storage server 110 by using the REST API.

Commands for giving an instruction to perform the backup processing are transmitted and received between the backup managing sections 220 and 230 and the storage server 110. On the other hand, real data is frequently transmitted and received between the business processing section 210 and the storage server 110 in addition to a command for an I/O execution instruction. Therefore, more resources (for example, amounts of usage of the processor 201 and memory, the number of communication ports and pieces of authentication information, or the like) for communicating with the storage server 110 are allocated to the business processing section 210 than the backup managing sections 220 and 230.

From such a constraint, a process for communication with the storage server 110 is shared between the backup managing section 220 and the backup managing section 230, as illustrated in the following FIG. 5.

Figure 5:
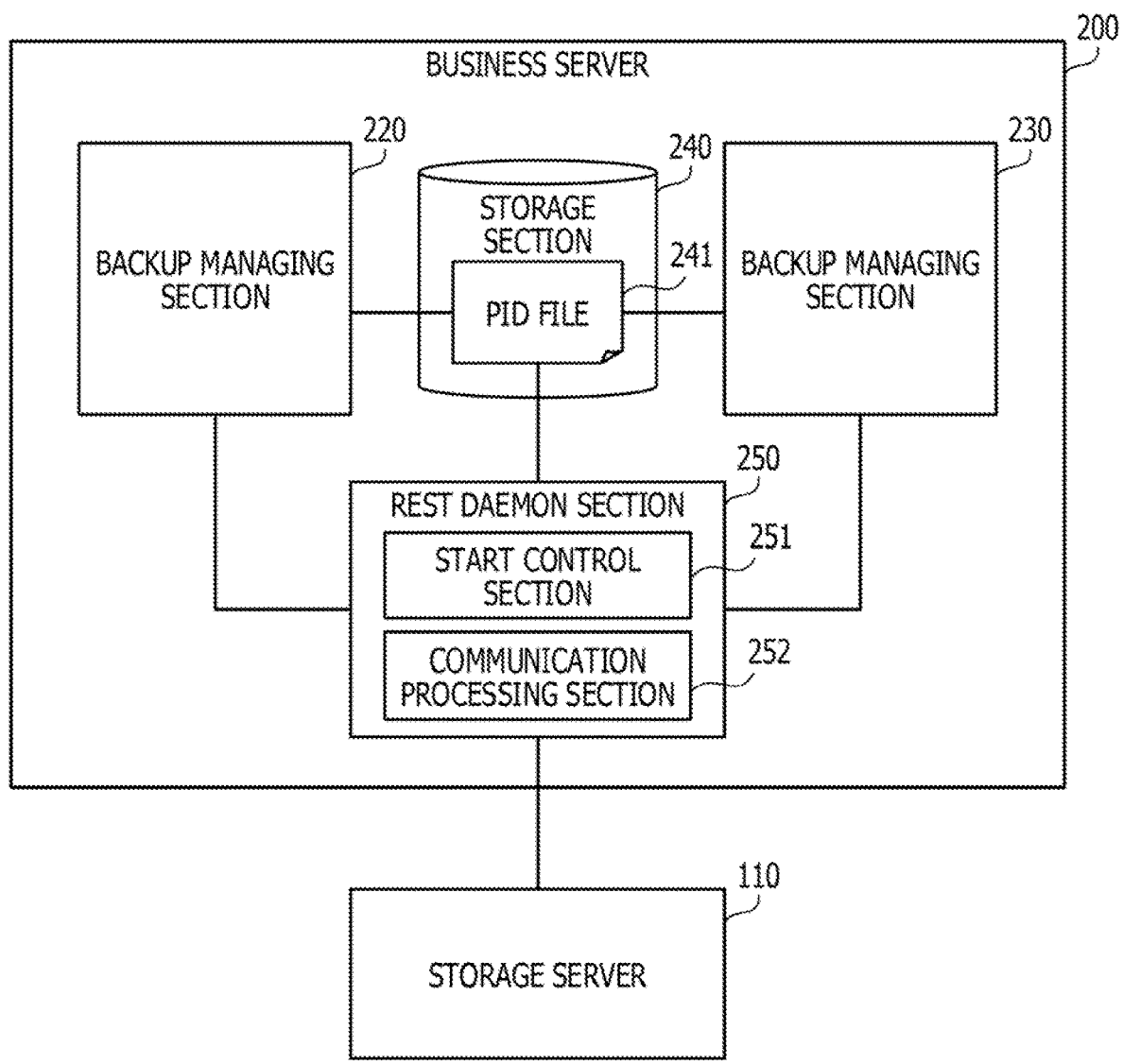
FIG. 5 is a diagram illustrating an example of a configuration of processing functions in regard to communication with a storage server, processing functions being provided to a business server.

FIG. 5 is a diagram illustrating an example of a configuration of processing functions related to communication with a storage server, processing functions being provided to a business server. As illustrated in FIG. 5, the business server 200 further includes a storage section 240 and a REST daemon section 250. Incidentally, the processing of the REST daemon section 250 is an example of the first process 1 in FIG. 1. In this case, the processing of each of the backup managing sections 220 and 230 corresponds to an example of the second process 2 in FIG. 1.

The storage section 240 is, for example, implemented by a storage area of a storage device provided to the business server 200, such as the RAM 202 or the like. The storage section 240 stores information needed by the backup managing sections 220 and 230 to communicate with the storage server 110 via the REST daemon section 250. For example, the storage section 240 stores a process identification (PID) file 241. The PID file 241 describes a process ID indicating a process executed by the REST daemon section 250, a port number used in communication, and the like. The PID file 241 is generated by the REST daemon section 250 at a time of starting the REST daemon section 250 and stored in the storage section 240, and is referred to when the backup managing sections 220 and 230 request the REST daemon section 250 to perform communication. Incidentally, a location where the PID file 241 is stored is, for example, determined in advance by directory information or the like.

The processing of the REST daemon section 250 is, for example, implemented by the processor 201 by executing a given program. In the present embodiment, the processing of the REST daemon section 250 is implemented by the execution of a daemon program as a kind of program executed in the background. The REST daemon section 250 is a processing module that performs, by proxy, communication using the REST API in response to requests from the backup managing sections 220 and 230. The REST daemon section 250 transmits REST API requests to the storage server 110 in response to requests from the backup managing sections 220 and 230.

The REST daemon section 250 is shared between the backup managing section 220 and the backup managing section 230. In addition, the REST daemon section 250 communicates with the storage server 110 using one communication port. Thus, the number of communication ports and pieces of authentication information used in communication between the backup managing sections 220 and 230 and the storage server 110 may be limited to only one, and a communication processing load of the backup managing sections 220 and 230 may be reduced. As a result, more communication ports and more pieces of authentication information may be assigned to communication between the business processing section 210 and the storage server 110. Then, it is possible to reduce a possibility that communication between the backup managing sections 220 and 230 and the storage server 110 degrades communication performance between the business processing section 210 and the storage server 110.

The REST daemon section 250 is started by one of the backup managing sections 220 and 230 that requests communication to be performed (which backup managing section will be described as a "requester" here). The REST daemon section 250 generates the PID file 241 and stores the PID file 241 in the storage section 240 in a process of start processing. When the start processing is completed, the REST daemon section 250 performs interprocess communication with the requester in response to a request from the requester. When coupling is established, the REST daemon section 250 performs communication using the REST API with the storage server 110 in response to a request from the requester.

In the present embodiment, the REST daemon section 250 includes a start control section 251 and a communication processing section 252. When the REST daemon section 250 is started, the start control section 251 is started first, and the start control section 251 performs start control processing. In the start control processing, the start control section 251 starts the communication processing section 252, and generates the PID file 241 and stores the PID file 241 in the storage section 240. The PID file 241 describes a process 1D indicating a process executed by the communication processing section 252. When the communication processing section 252 is started by the start control section 251, the communication processing section 252 performs communication using the REST API.

Incidentally, in actuality, for example, the processing of the communication processing section 252 may be implemented by a daemon program, and the processing of the start control section 251 may be implemented by a start control program for starting the daemon program, the start control program accompanying the daemon program.

Next, referring to FIGS. 6 to 9, description will be made of a comparative example with regard to procedures for communication of the backup managing sections 220 and 230 via the REST daemon section 250. Description will then be made of communication procedures in the present embodiment.

Figure 6:
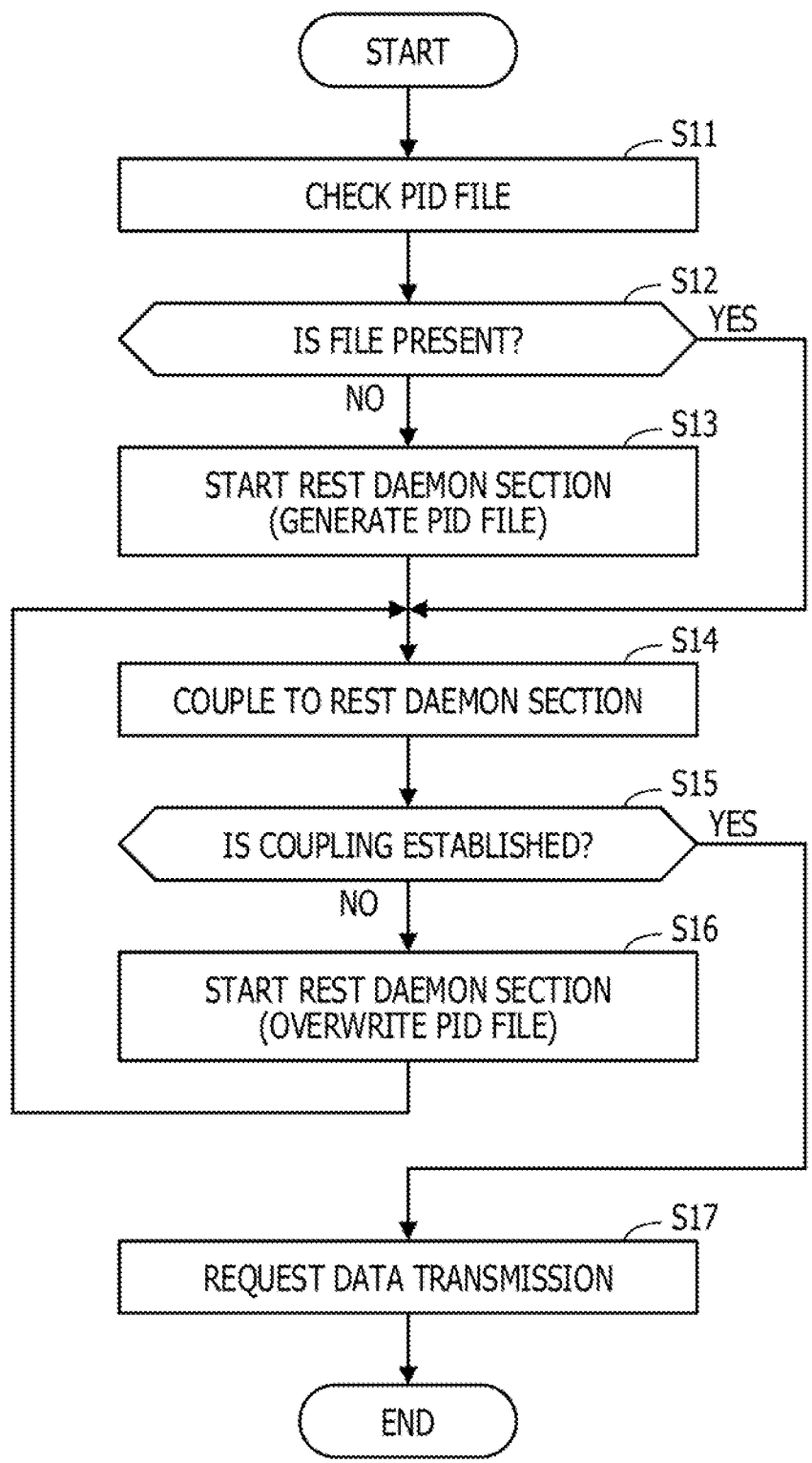
FIG. 6 is an example of a flowchart illustrating a communication processing procedure of a backup managing section in a first comparative example.

First, with reference to FIG. 6 and FIG. 7, description will be made of a first comparative example with regard to communication processing procedures. FIG. 6 is an example of a flowchart illustrating a communication processing procedure of a backup managing section in the first comparative example. In the following, the processing of the backup managing section 220 will be described as an example. However, the backup managing section 230, also, may communicate with the storage server 110 via the REST daemon section 250 by similar processing.

The backup managing section 220 receives a command indicating processing to be performed by the storage server 110 from the administrator terminal 310. The received command is principally a command to perform the backup processing to be performed by the storage server 110. When the backup managing section 220 receives the command, the backup managing section 220 performs processing as follows.

The backup managing section 220 (and the backup managing section 230) may make the REST daemon section 250 perform communication with the storage server 110 by referring to the PID file 241. Accordingly, the backup managing section 220 first checks whether the PID file 241 is present in the storage section 240 (step S11).

When the PID file 241 is present (step S12: Yes), the backup managing section 220 determines that the REST daemon section 250 is started, and requests coupling from the REST daemon section 250 (step S14). This coupling request, for example, requests coupling of interprocess communication using a socket (socket coupling). In addition, at a time of the coupling request, the backup managing section 220 reads a process 1D and a port number from the PID file 241, and notifies the process 1D and the port number to the REST daemon section 250. Coupling to the REST daemon section 250 thereby becomes possible.

When the PID file 241 is not present (step S12: No), on the other hand, the backup managing section 220 determines that the REST daemon section 250 is not started, and starts the REST daemon section 250 (step S13). At this time, the REST daemon section 250 generates the PID file 241 and stores the PID file 241 in the storage section 240 in a process of the start processing. Thereafter, the backup managing section 220 requests coupling from the REST daemon section 250 (step S14).

Next, when coupling (socket coupling) to the REST daemon section 250 is established (step S15: Yes), the backup managing section 220 requests data transmission from the REST daemon section 250 (step S17). For example, the REST daemon section 250 is requested to transmit a command indicating processing to be performed by the storage server 110. In addition, also at a time of the data transmission request, the process 1D and the port number read from the PID file 241 are notified to the REST daemon section 250. The REST daemon section 250 generates a REST API request in response to the data transmission request, and transmits the REST API request to the storage server 110. Data (command) requested to be transmitted from the backup managing section 220 is thereby transmitted to the storage server 110. When the data transmission is completed normally, the backup managing section 220 receives a completion notification from the REST daemon section 250, and transmits response information indicating that the data transmission is completed normally to the administrator terminal 310.

In addition, when coupling to the REST daemon section 250 fails (step S15: No), the backup managing section 220 starts the REST daemon section 250 again (step S16). As in the case of step S13, the REST daemon section 250 generates the PID file 241 and stores the PID file 241 in the storage section 240 in a process of the start processing. Thereafter, the backup managing section 220 requests coupling from the REST daemon section 250 (step S14). Then, when coupling is established (step S15: Yes), the backup managing section 220 requests data transmission from the REST daemon section 250 (step S17).

As described above, in the first comparative example, the backup managing section 220 may communicate with the storage server 110 via the REST daemon section 250. The processing of the REST daemon section 250 is performed as a background process. A user side transmitting the command to the backup managing section 220 (administrator of the administrator terminal 310 in this case) is therefore not aware that the REST daemon section 250 intervenes in the communication with the storage server 110. The same is true for processing when the backup managing section 230 communicates with the storage server 110 via the REST daemon section 250.

In addition, the backup managing section 220 may determine whether the REST daemon section 250 is started based on the presence or absence of the PID file 241 and the necessity of coupling to the REST daemon section 250. When the backup managing section 220 then determines that the REST daemon section 250 is not started, the backup managing section 220 may continue processing related to communication with the storage server 110 by starting the REST daemon section 250. The same is true for the processing when the backup managing section 230 communicates with the storage server 110 via the REST daemon section 250.

Figure 7:
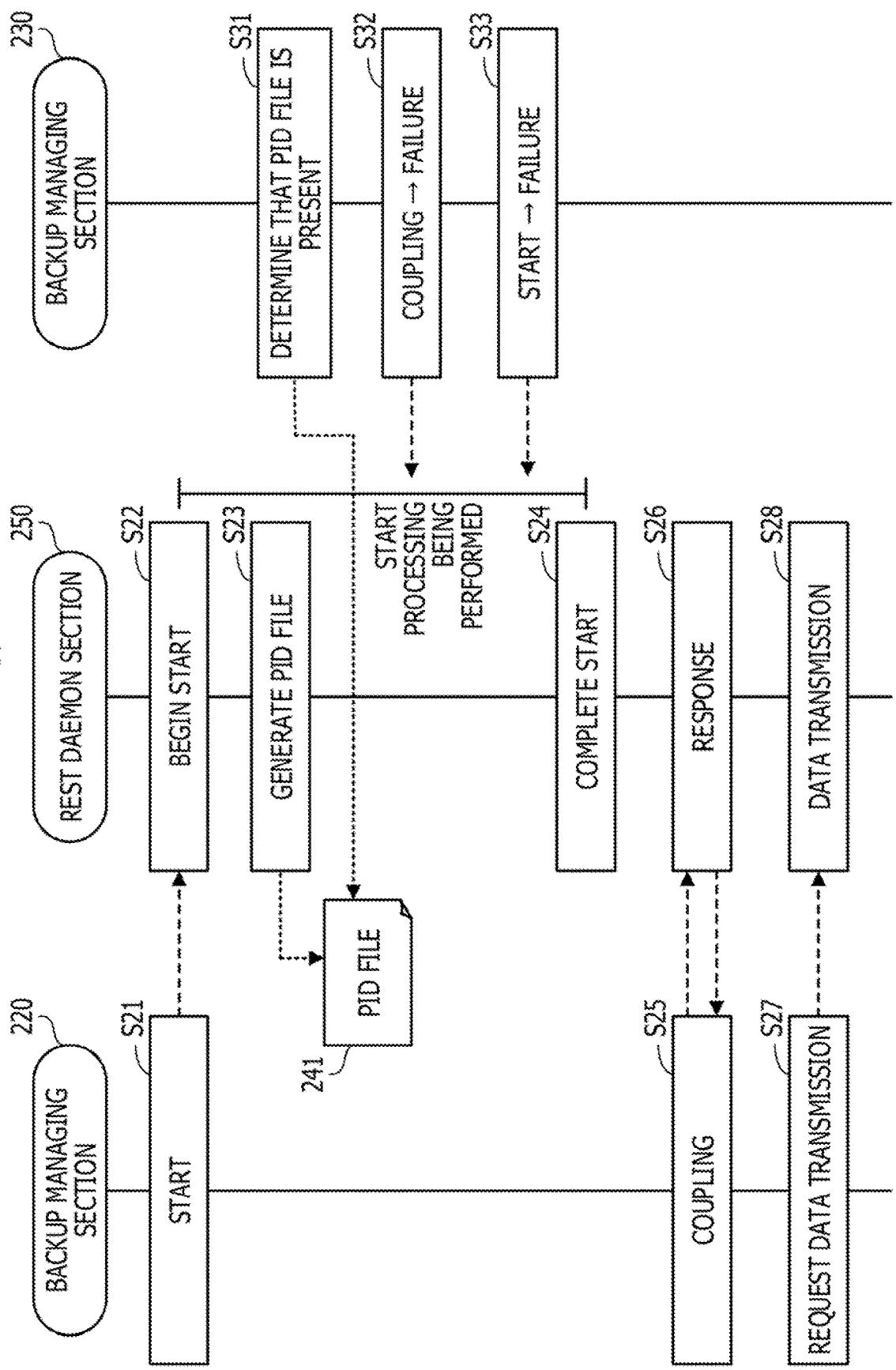
FIG. 7 is an example of a sequence diagram illustrating communication processing procedures of backup managing sections and a REST daemon section in the first comparative example.

FIG. 7 is an example of a sequence diagram illustrating communication processing procedures of backup managing sections and a REST daemon section in the first comparative example. Suppose that in the example of FIG. 7, a command to perform backup processing is transmitted from the administrator terminal 310 to the backup managing section 220. As described earlier, the backup managing section 220 first determines whether the PID file 241 is present in the storage section 240. Suppose here that the PID file 241 is not present. In this case, the backup managing section 220 determines that the REST daemon section 250 is not started, and starts the REST daemon section 250 as illustrated in FIG. 7 (step S21). The REST daemon section 250 begins start processing (step S22), and generates the PID file 241 and stores the PID file 241 in the storage section 240 in a process of the start processing (step S23).

In actuality, the start control section 251 is started first, and the processing of the start control section 251 starts the communication processing section 252, and generates the PID file 241. Then, when the generated PID file 241 is stored in the storage section 240 and the starting of the communication processing section 252 is completed, the start processing of the REST daemon section 250 is completed (step S24). Hence, in the following description, processing from the beginning of the start processing of the start control section 251 to completion of the start processing of the communication processing section 252 will be described as the "start processing of the REST daemon section 250."

Next, using the process 1D and the port number read from the PID file 241, the backup managing section 220 requests coupling from the REST daemon section 250 (step S25). When the REST daemon section 250 responds to the coupling request and coupling is established (step S26), the backup managing section 220 requests data transmission from the REST daemon section 250 (step S27). In response to the data transmission request, the REST daemon section 250 transmits a REST API request to the storage server 110 (step S28). Data requested to be transmitted is thereby transmitted to the storage server 110. Incidentally, though not illustrated, when the data transmission is completed normally, the backup managing section 220 receives a completion notification from the REST daemon section 250, and transmits response information indicating that the data transmission is completed normally to the administrator terminal 310.

As described earlier, both of the backup managing sections 220 and 230 may be operated simultaneously in the business server 200. Suppose that in FIG. 7, during the start processing of the REST daemon section 250, a command indicating processing to be performed by the storage server 110 is transmitted from the backup managing section 321 of the management server 320 to the backup managing section 230.

In this case, the backup managing section 230 first checks whether the PID file 241 is present in the storage section 240. Supposing that the PID file 241 is already generated by the processing of step S23, the backup managing section 230 determines that the REST daemon section 250 is started because the PID file 241 is present (step S31). The backup managing section 230 then requests coupling from the REST daemon section 250 based on the PID file 241 (step S32).

However, when the start processing of the REST daemon section 250 is not completed yet, the backup managing section 230 fails in coupling to the REST daemon section 250. In this case, the backup managing section 230 determines that the REST daemon section 250 is not operated, and attempts to start the REST daemon section 250 (step S33). At this time, the REST daemon section 250 is in the middle of the start processing, or the start processing is already completed. Thus, the backup managing section 230 fails in starting the REST daemon section 250. In this case, the backup managing section 230 determines that it is difficult to transmit data because it is difficult to start the REST daemon section 250, and transmits response information indicating occurrence of an error to the backup managing section 321 of the management server 320.

Thus, when one of the backup managing sections 220 and 230 attempts to communicate via the REST daemon section 250, the communication is difficult in a case where the start processing of the REST daemon section 250 is being performed according to a request from the other of the backup managing sections 220 and 230. Here, as described earlier, the user side transmitting commands to the backup managing sections 220 and 230 is not aware that the REST daemon section 250 intervenes in the communication with the storage server 110. Therefore, it is not desirable to cause errors due to the operation of the REST daemon section 250 as in the example of FIG. 7 rather than errors in the backup managing sections 220 and 230 themselves. There is thus a desire for a mechanism that reduces the latter errors as much as possible.

The cause of the error occurring in FIG. 7 is the absence of a mechanism in which the backup managing sections 220 and 230 check whether or not the start processing of the REST daemon section 250 is completed. Accordingly, in a second comparative example illustrated in the following FIG. 8 and FIG. 9, a mechanism is added in which information indicating that the REST daemon section 250 is performing the start processing is described in the PID file 241 while the REST daemon section 250 is performing the start processing.

Figure 8:
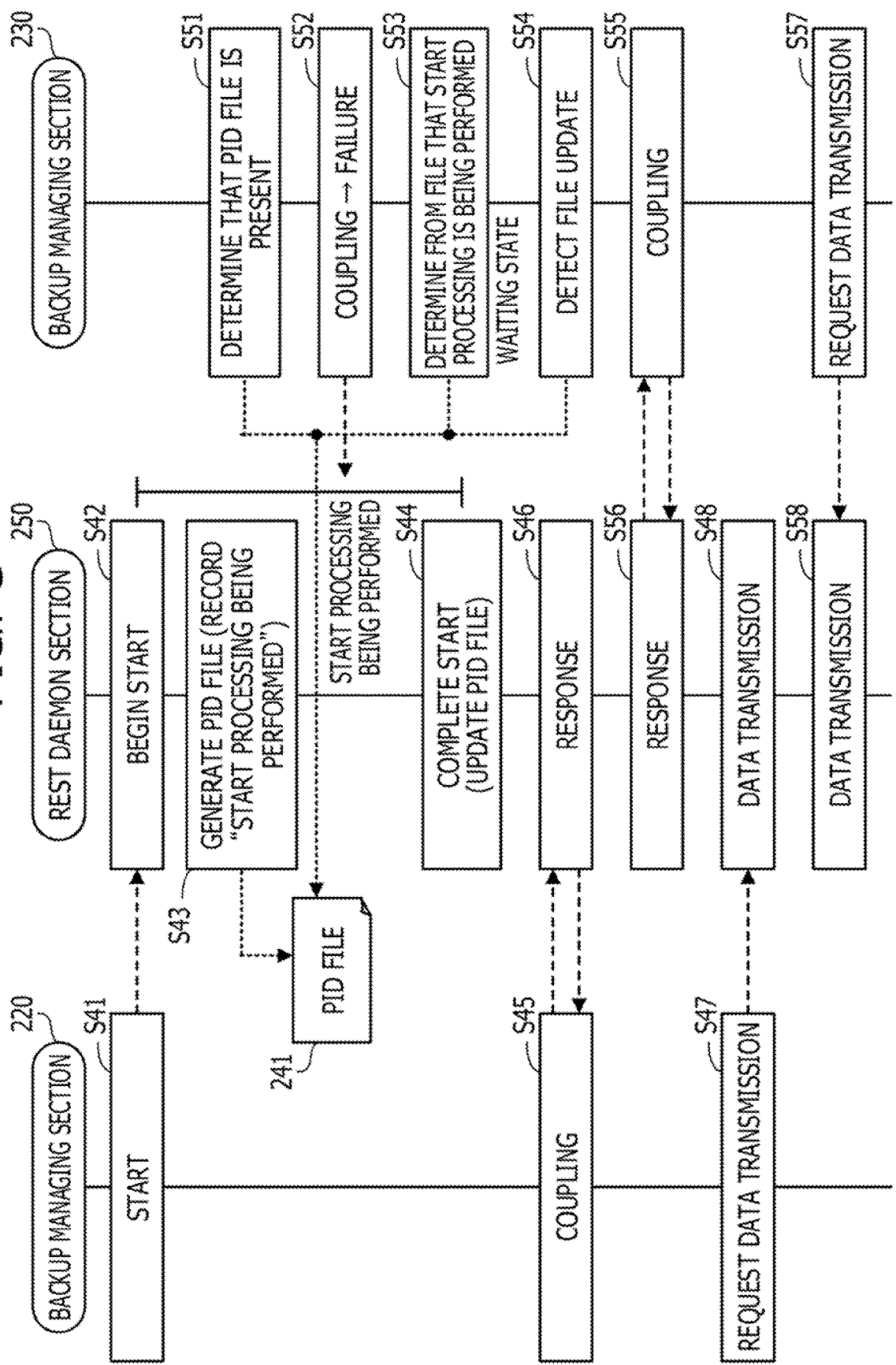
FIG. 8 is a first example of a sequence diagram illustrating communication processing procedures of backup managing sections and a REST daemon section in a second comparative example.

FIG. 8 is a first example of a sequence diagram illustrating communication processing procedures of backup managing sections and a REST daemon section in the second comparative example. FIG. 8 illustrates a case where a command is first transmitted from the administrator terminal 310 to the backup managing section 220 as in FIG. 7. Of steps S41 to S48 illustrated in FIG. 8, the processing of steps S41, S42, and S45 to S48 is similar to the processing of steps S21, S22, and S25 to S28, respectively, illustrated in FIG. 7. On the other hand, a part of the processing of steps S43 and S44 is different from the processing of steps S23 and S24.

For example, the backup managing section 220 determines that the PID file 241 is not present in the storage section 240 and that the REST daemon section 250 is not started, and the backup managing section 220 starts the REST daemon section 250 (step S41). The REST daemon section 250 begins start processing (step S42), and generates the PID file 241 and stores the PID file 241 in the storage section 240 in a process of the start processing (step S43). However, in step S43, the REST daemon section 250 records information indicating that the "start processing is being performed" in the generated PID file 241.

The start processing of the REST daemon section 250 is subsequently completed (step S44). In the step S44, the REST daemon section 250 completes the start processing after updating the PID file 241 so as to indicate completion of the start processing. For example, the information indicating that the start processing is being performed is erased in the PID file 241.

Thereafter, as in FIG. 7, using the process ID and the port number read from the PID file 241, the backup managing section 220 requests coupling from the REST daemon section 250 (step S45). When the REST daemon section 250 responds to the coupling request and coupling is established (step S46), the backup managing section 220 requests data transmission from the REST daemon section 250 (step S47). In response to the data transmission request, the REST daemon section 250 transmits a REST API request to the storage server 110 (step S48). Data requested to be transmitted is thereby transmitted to the storage server 110.

Meanwhile, suppose that a command indicating processing to be performed by the storage server 110 is transmitted from the backup managing section 321 of the management server 320 to the backup managing section 230 during the start processing of the REST daemon section 250. In this case, the backup managing section 230 first checks whether the PID file 241 is present in the storage section 240. Supposing that the PID file 241 is already generated by the processing of step S43, the backup managing section 230 determines that the REST daemon section 250 is started (step S51). Then, the backup managing section 230 requests coupling from the REST daemon section 250 based on the PID file 241 (step S52).

However, when the start processing of the REST daemon section 250 is not completed yet, the backup managing section 230 fails in coupling to the REST daemon section 250. Then, the backup managing section 230 reads the information indicating that the start processing is being performed from the PID file 241, and determines based on this information that the REST daemon section 250 is performing the start processing (step S53). In this case, the backup managing section 230 is in a state of waiting for a start of the REST daemon section 250. The backup managing section 230, for example, reads the PID file 241 at each certain time, and determines whether the start processing of the REST daemon section 250 is completed.

When the backup managing section 230 then detects that the PID file 241 is updated in step S44, the backup managing section 230 determines that the start processing of the REST daemon section 250 is completed (step S54). Using the process ID and the port number read from the PID file 241, the backup managing section 230 requests coupling from the REST daemon section 250 (step S55). When the REST daemon section 250 responds to the coupling request and coupling is established (step S56), the backup managing section 230 requests data transmission from the REST daemon section 250 (step S57). In response to the data transmission request, the REST daemon section 250 transmits a REST API request to the storage server 110 (step S58). Data requested to be transmitted is thereby transmitted to the storage server 110.

Thus, in the second comparative example, the backup managing section 230 may continue processing and complete communication even in a case where the start processing of the REST daemon section 250 is being performed according to a request from the backup managing section 220 when the backup managing section 230 intends to communicate via the REST daemon section 250. However, when the start processing of the REST daemon section 250 is ended abnormally without being completed properly as illustrated in the following FIG. 9, the PID file 241 remains in which the information indicating that the start processing is being performed is recorded. Then, it is difficult to perform communication of one of the backup managing sections 220 and 230 normally because of the remaining PID file 241.

Figure 9:
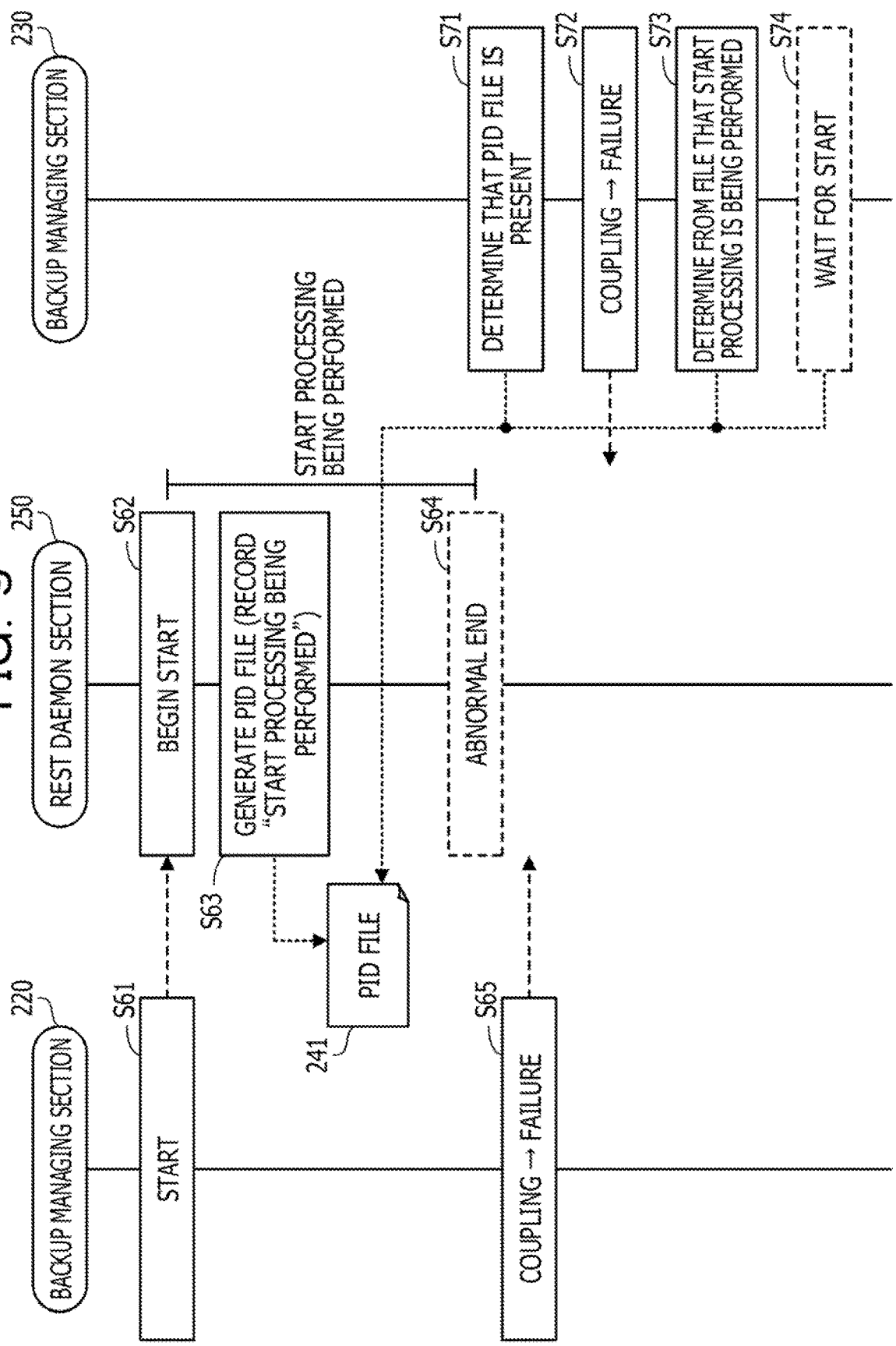
FIG. 9 is a second example of a sequence diagram illustrating communication processing procedures of backup managing sections and a REST daemon section in the second comparative example.

FIG. 9 is a second example of a sequence diagram illustrating communication processing procedures of backup managing sections and a REST daemon section in the second comparative example. FIG. 9 illustrates a case where a command is first transmitted from the administrator terminal 310 to the backup managing section 220 as in FIG. 8.

As in FIG. 8, the backup managing section 220 determines that the PID file 241 is not present in the storage section 240 and that the REST daemon section 250 is not started, and the backup managing section 220 starts the REST daemon section 250 (step S61). The REST daemon section 250 begins start processing (step S62), and generates the PID file 241 and stores the PID file 241 in the storage section 240 in a process of the start processing (step S63). In the step S63, information indicating that the start processing is being performed is recorded in the generated PID file 241.

Suppose that in the example of FIG. 9, the start processing of the REST daemon section 250 is thereafter ended abnormally (step S64). In this case, the PID file 241 in which the information indicating that the start processing is being performed remains recorded remains in the storage section 240. Incidentally, the backup managing section 220 attempts to couple to the REST daemon section 250, but fails in coupling to the REST daemon section 250 (step S65).

Meanwhile, suppose that a command indicating processing to be performed by the storage server 110 is transmitted from the backup managing section 321 of the management server 320 to the backup managing section 230 after the REST daemon section 250 is ended abnormally. The backup managing section 230 determines whether the PID file 241 is present in the storage section 240. The PID file 241 generated by the processing of step S63 remains. The backup managing section 230 therefore determines that the REST daemon section 250 is started (step S71). Then, the backup managing section 230 requests coupling from the REST daemon section 250 based on the PID file 241. However, because the REST daemon section 250 is ended abnormally, the backup managing section 230 fails in the coupling (step S72).

Then, the backup managing section 230 reads the information indicating that the start processing is being performed from the PID file 241, and erroneously determines based on this information that the REST daemon section 250 is performing the start processing (step S73). Then, the backup managing section 230 is in a state of waiting for a start of the REST daemon section 250 (step S74). The backup managing section 230 is set in the waiting state until the PID file 241 is updated so as to indicate that the start processing is not being performed. However, because the REST daemon section 250 is ended abnormally, the waiting state continues, and it is difficult to communicate with the storage server 110.

Thus, in the second comparative example, when the start processing of the REST daemon section 250 is ended abnormally, there is a possibility that the backup managing sections 220 and 230 erroneously determine based on the remaining PID file 241 that the REST daemon section 250 is performing the start processing. In such a case, it is difficult to perform communication normally.

The following description will be made of the processing of the business server 200 according to the second embodiment.

In the second embodiment, the PID file 241 is locked only during the start processing of the REST daemon section 250. A lock represents a state in which updating of the PID file 241 is not permitted. In addition, the PID file 241 is locked only while the REST daemon section 250 is operating, and the PID file 241 is released in a state in which the operation of the REST daemon section 250 is stopped.

Such a lock mechanism is executed by using a lock function and a lock releasing function. The lock function is a function that locks the file and enables determination of whether or not the file is locked. When the lock function is executed in a state in which the file is not locked, the file is locked. When the lock function is executed in a state in which the file is locked, on the other hand, a response (for example, output of a given value) indicating that the file is locked is made. In addition, the locking of the file is released when the lock releasing function is executed and when a process that locks the file is stopped. Examples of the case where the "process that locks the file is stopped" include a case where the process is ended abnormally.

Such a lock mechanism may be implemented by functions as follows, for example. In a case where the REST daemon section 250 is implemented by a java (registered trademark) program, for example, "tryLock" may be used as a method corresponding to the lock function, and "release" may be used as a method corresponding to the lock releasing function. In this case, in actuality, a lock file different from the file to be locked is created in association with the file, and the lock file is locked and lock-released. Incidentally, lock processing and lock releasing processing in response to calling of the "tryLock" method and the "release" method and lock releasing processing accompanying the stopping of the process that locks the file are performed by a java execution module (for example, a java virtual machine).

In the business server 200, the PID file 241 is locked by executing the lock function in a process of the start processing of the REST daemon section 250, and when the start processing is completed, the REST daemon section 250 releases the lock by executing the lock releasing function. Thus, the lock is released also when an abnormality occurs in the start processing of the REST daemon section 250 and the REST daemon section 250 is ended abnormally. Hence, the PID file 241 is locked only while the start processing of the REST daemon section 250 is performed normally.

Therefore, when the PID file 241 is present but it is difficult to couple to the REST daemon section 250, the backup managing sections 220 and 230 may determine whether the REST daemon section 250 is in the middle of the start processing or in a state of not operating according to the presence or absence of the lock. Then, the backup managing sections 220 and 230 may select processing to be performed next according to a result of the determination so that the processing continues correctly.

Figure 10:
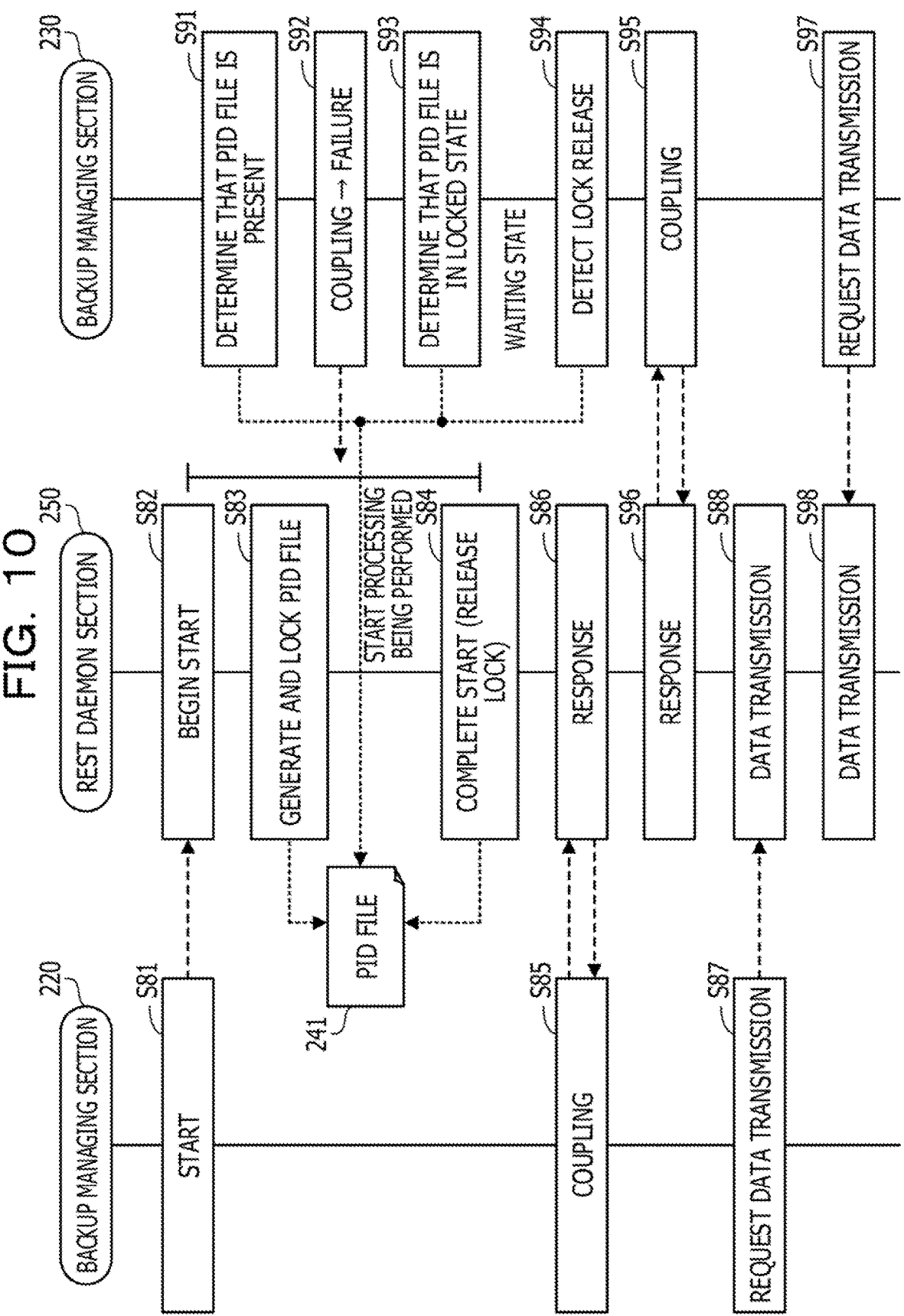
FIG. 10 is a first example of a sequence diagram illustrating communication processing procedures of backup managing sections and a REST daemon section in the second embodiment.

FIG. 10 is a first example of a sequence diagram illustrating communication processing procedures of backup managing sections and a REST daemon section in the second embodiment. Suppose that in the example of FIG. 10, a command to perform backup processing is transmitted from the administrator terminal 310 to the backup managing section 220. The backup managing section 220 first determines whether the PID file 241 is present in the storage section 240. Supposing here that the PID file 241 is not present, the backup managing section 220 determines that the REST daemon section 250 is not started, and starts the REST daemon section 250 (step S81).

The REST daemon section 250 begins start processing (step S82), generates the PID file 241 and stores the PID file 241 in the storage section 240 in a process of the start processing, and locks the PID file 241 (step S83). In actual processing, the backup managing section 220 starts the start control section 251 of the REST daemon section 250. The processing of the start control section 251 generates and locks the PID file 241, and starts the communication processing section 252. Then, completion of the start processing of the communication processing section 252 completes the start processing of the REST daemon section 250. In addition, the start control section 251 releases the locking of the PID file 241 immediately before the completion of the start processing of the REST daemon section 250 (step S84).

Incidentally, the locking of the PID file 241 is, for example, performed by the start control section 251 by calling the "tryLock" method. In this case, releasing of the locking of the PID file 241 is performed by the start control section 251 by calling the "release" method.

Next, using the process 1D and the port number read from the PID file 241, the backup managing section 220 requests coupling from the REST daemon section 250 (step S85). Suppose here that the communication processing section 252 of the REST daemon section 250 responds to the coupling request, and that coupling is thereby established (step S86). Incidentally, in step S85, for example, a function requesting socket coupling is called, and interprocess communication becomes possible when the socket coupling is established in step S86. In a case where the processing of the REST daemon section 250 is implemented by a java program, a "connect" method is used as a method corresponding to the function.

When the coupling is established, the backup managing section 220 requests data transmission from the REST daemon section 250 (step S87). In response to the data transmission request, the communication processing section 252 of the REST daemon section 250 transmits a REST API request to the storage server 110 (step S88). Data requested to be transmitted (command requesting backup processing to be performed in this case) is thereby transmitted to the storage server 110. Incidentally, though not illustrated, when the data transmission is completed normally, the backup managing section 220 receives a completion notification from the communication processing section 252, and transmits response information indicating that the data transmission is completed normally to the administrator terminal 310.

Meanwhile, in FIG. 10, suppose that a command indicating processing to be performed by the storage server 110 is transmitted from the backup managing section 321 of the management server 320 to the backup managing section 230 during the start processing of the REST daemon section 250. In this case, the backup managing section 230 first checks whether the PID file 241 is present in the storage section 240. Supposing that here that the PID file 241 is already generated by the processing of step S83, the backup managing section 230 determines that the REST daemon section 250 is started because the PID file 241 is present (step S91). Then, the backup managing section 230 requests coupling from the REST daemon section 250 based on the PID file 241 (step S92).

However, in the example of FIG. 10, the start processing of the REST daemon section 250 is not completed, and therefore the backup managing section 230 fails in coupling to the REST daemon section 250. In this case, the backup managing section 230 checks whether or not the PID file 241 is locked (step S93). In the example of FIG. 10, the backup managing section 230 determines that the PID file 241 is locked, and the backup managing section 230 is set in a state of waiting for a lock release, for example, set in a state of waiting for completion of the start processing of the REST daemon section 250.

In the state of waiting for a lock release, the backup managing section 230 checks whether or not the PID file 241 is locked at each certain time. Then, when detecting that the lock is released by the processing of step S84 (step S94), the backup managing section 230 requests coupling from the REST daemon section 250 again based on the PID file 241 (step S95). Because the start processing of the REST daemon section 250 is completed, the communication processing section 252 of the REST daemon section 250 responds to the coupling request, and coupling is thereby established (step S96).

The backup managing section 230 requests data transmission from the REST daemon section 250 (step S97). In response to the data transmission request, the communication processing section 252 of the REST daemon section 250 transmits a REST API request to the storage server 110 (step S98). Data requested to be transmitted (command requesting backup processing to be performed in this case) is thereby transmitted to the storage server 110. Incidentally, though not illustrated, when the data transmission is completed normally, the backup managing section 230 receives a completion notification from the communication processing section 252, and transmits response information indicating that the data transmission is completed normally to the backup managing section 321 of the management server 320.

Thus, when the backup managing section 230 fails in coupling to the REST daemon section 250 using the PID file 241, the backup managing section 230 detects that the PID file 241 is locked, and may thereby recognize correctly that the start processing of the REST daemon section 250 is being performed. Because of this recognition, the backup managing section 230 may perform correct processing according to the present state of the REST daemon section 250, the correct processing being processing of waiting for the lock to be released, for example, waiting for the start processing of the REST daemon section 250 to be completed.

Figure 11:
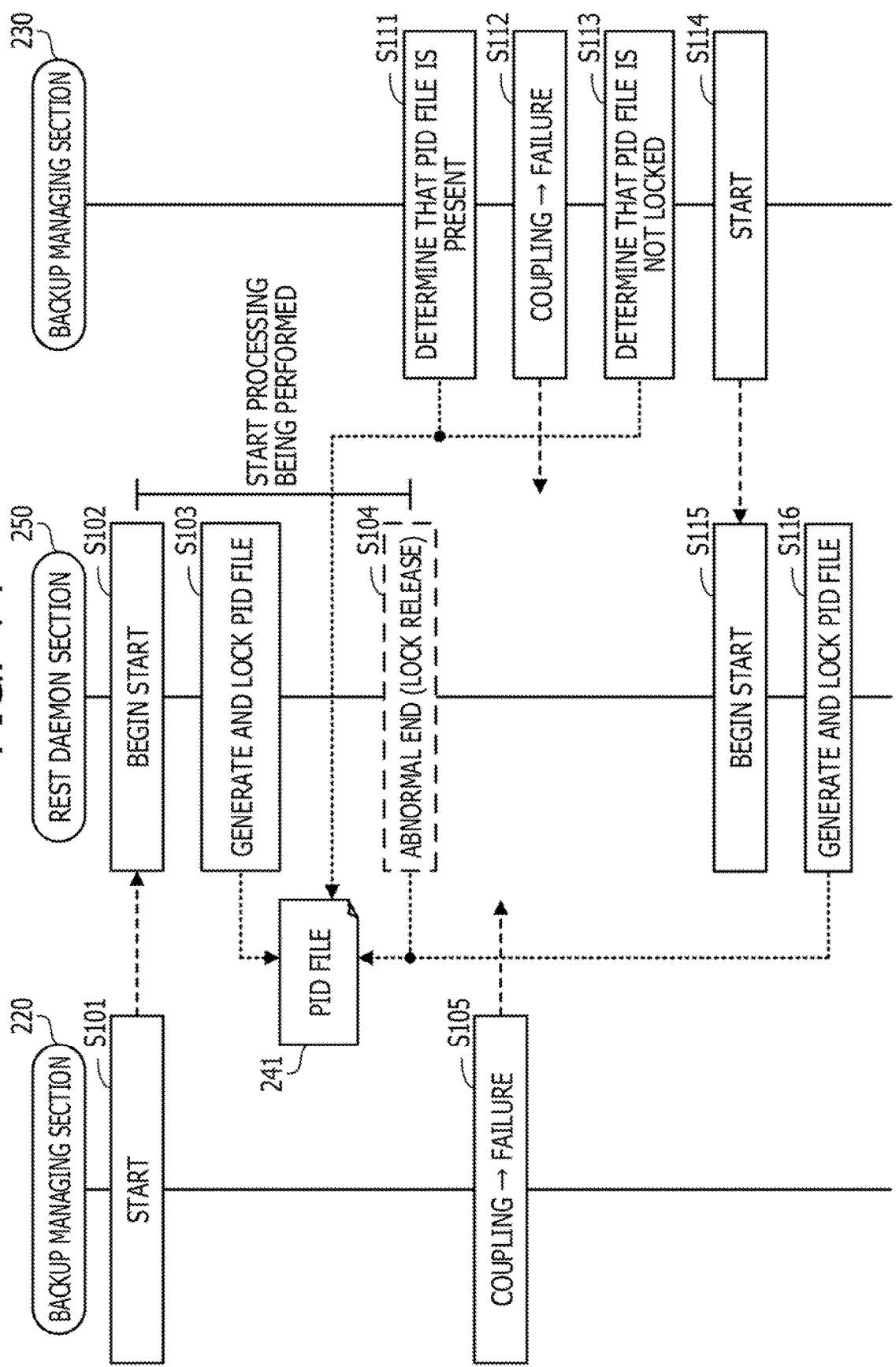
FIG. 11 is a second example of a sequence diagram illustrating communication processing procedures of backup managing sections and a REST daemon section in the second embodiment.

FIG. 11 is a second example of a sequence diagram illustrating communication processing procedures of backup managing sections and a REST daemon section in the second embodiment. Suppose that also in the example of FIG. 11, as in FIG. 10, a command to perform backup processing is transmitted from the administrator terminal 310 to the backup managing section 220. The processing of steps S101 to S103 illustrated in FIG. 11 is similar to steps S81 to S83, respectively, in FIG. 10. For example, first, the backup managing section 220 determines that the PID file 241 is not present in the storage section 240 and thus the REST daemon section 250 is not started, and the backup managing section 220 starts the REST daemon section 250 (step S101). The REST daemon section 250 begins start processing (step S102), generates the PID file 241 and stores the PID file 241 in the storage section 240 in a process of the start processing, and locks the PID file 241 (step S103).

However, suppose that in FIG. 11, unlike FIG. 10, the start processing of the REST daemon section 250 is ended abnormally (step S104). In this case, the locking of the PID file 241 is released. For example, in this state, the unlocked PID file 241 remains as it is in the storage section 240. Incidentally, the backup managing section 220 attempts to couple to the REST daemon section 250, but fails in coupling to the REST daemon section 250 (step S105).

Meanwhile, suppose that in the example of FIG. 11, a command indicating processing to be performed by the storage server 110 is transmitted from the backup managing section 321 of the management server 320 to the backup managing section 230 after the REST daemon section 250 is ended abnormally. In this case, the backup managing section 230 first checks whether the PID file 241 is present in the storage section 240. In this case, because the PID file 241 is present, the backup managing section 230 determines that the REST daemon section 250 is started (step S111). Then, the backup managing section 230 requests coupling from the REST daemon section 250 based on the PID file 241 (step S112).

However, because the start processing of the REST daemon section 250 is ended abnormally, the backup managing section 230 fails in coupling to the REST daemon section 250. In this case, the backup managing section 230 checks whether or not the PID file 241 is locked (step S113). In the example of FIG. 11, because the PID file 241 is not locked, the backup managing section 230 determines that an abnormality has occurred in the REST daemon section 250, and starts the REST daemon section 250 (step S114).

Thus, the REST daemon section 250 begins the start processing again (step S115), generates the PID file 241 and stores the PID file 241 in the storage section 240 in a process of the start processing, and locks the PID file 241 (step S116). Incidentally, suppose that in step S115, as an example, the start control section 251 of the REST daemon section 250 generates a new PID file 241, and updates the PID file 241 stored in the storage section 240 with the generated PID file 241. This is to perform the same processing of generating the PID file 241 even when the start processing of the REST daemon section 250 is started under any condition.

Thereafter, though not illustrated, when the start processing of the REST daemon section 250 is completed normally, the locking of the PID file 241 is released. When the backup managing section 230 detects that the lock is released, the backup managing section 230 requests coupling from the REST daemon section 250. The backup managing section 230 may transmit data to the storage server 110 when coupling is established.

Thus, when the backup managing section 230 fails in coupling to the REST daemon section 250 using the PID file 241, the backup managing section 230 detects that the PID file 241 is not locked, and may thereby recognize correctly that an abnormality has occurred in the REST daemon section 250. Because of this recognition, the backup managing section 230 may perform correct processing according to the present state of the REST daemon section 250, the correct processing being processing of starting the REST daemon section 250.

The processing of the backup managing sections 220 and 230 will next be described with reference to a flowchart.

Figure 12:
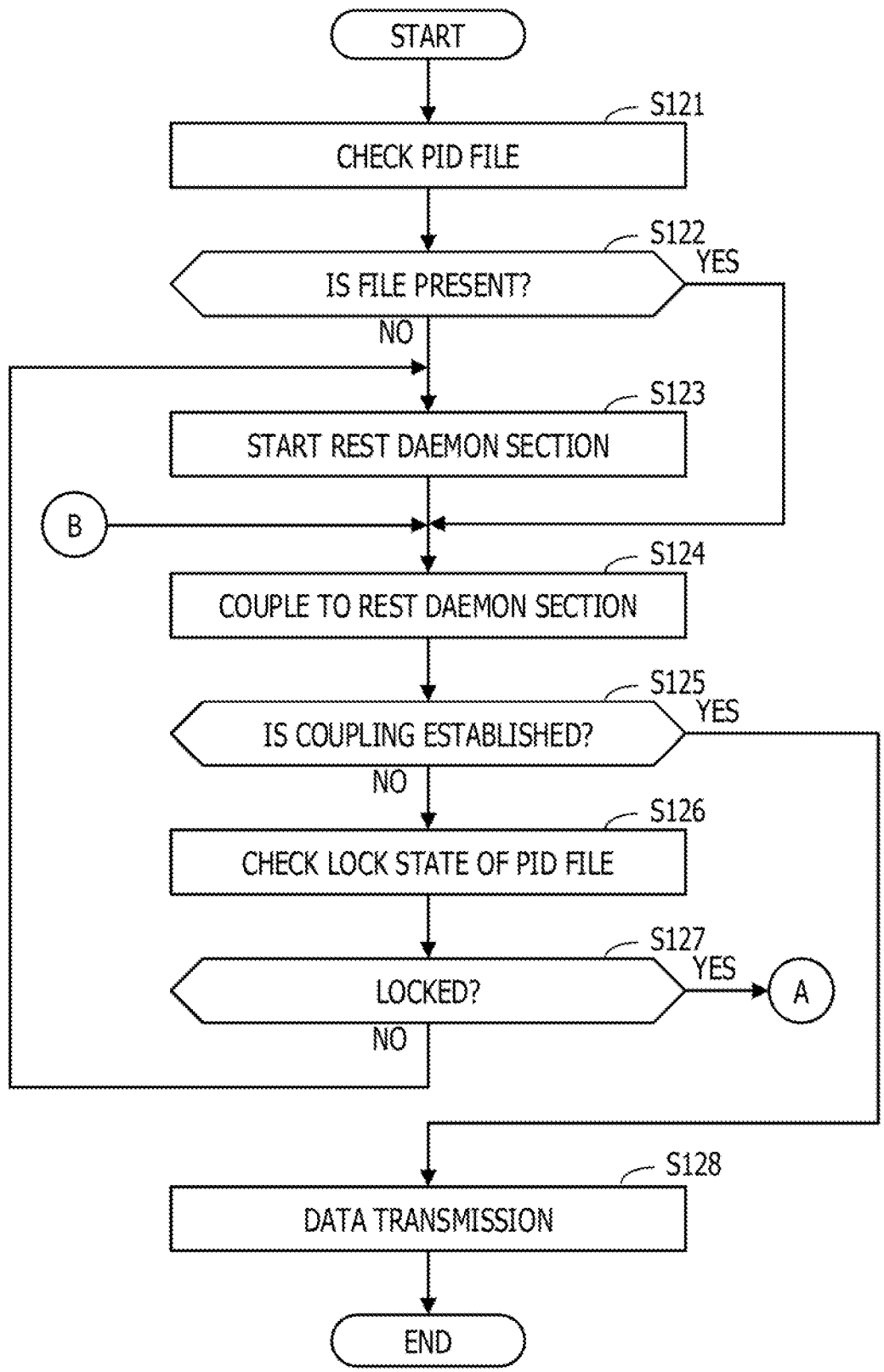
FIG. 12 is an example (1) of a flowchart illustrating a processing procedure of a backup managing section in the second embodiment.
Figure 13:
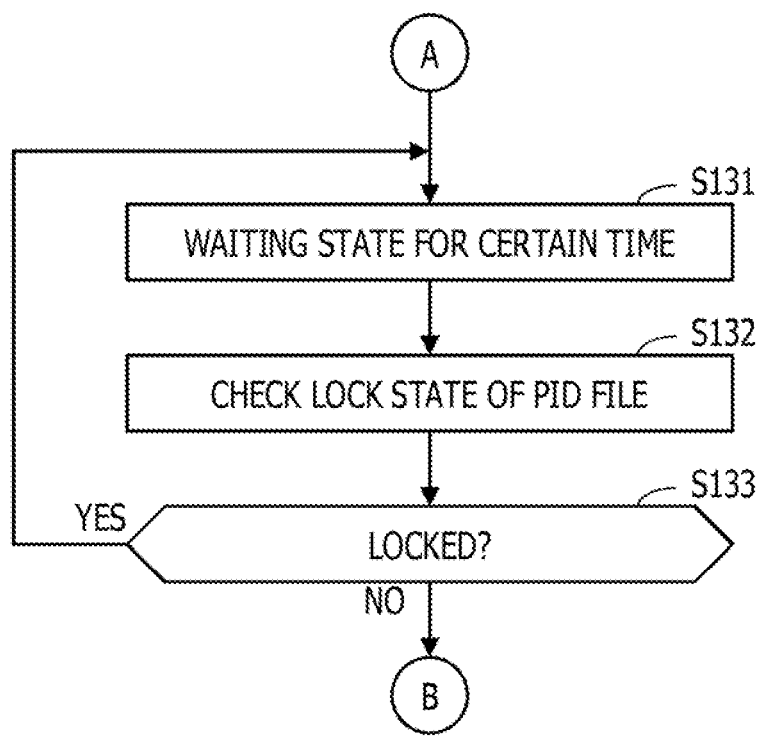
FIG. 13 is an example (2) of a flowchart illustrating a processing procedure of a backup managing section in the second embodiment.

FIG. 12 and FIG. 13 are an example of a flowchart illustrating a processing procedure of a backup managing section in the second embodiment. Incidentally, processing illustrated in FIG. 12 and FIG. 13 is performed in common by both of the backup managing sections 220 and 230.

[Step S121] The backup managing section checks whether the PID file 241 is present in the storage section 240.

[Step S122] When the PID file 241 is present in the storage section 240, the backup managing section performs the processing of step S124. When the PID file 241 is not present, the backup managing section performs the processing of step S123.

[Step S123] The backup managing section starts the REST daemon section 250. For example, the backup managing section starts the start control section 251 of the REST daemon section 250. The start control processing of the REST daemon section 250 is thereby performed. The start control processing generates the PID file 241 and stores the PID file 241 in the storage section 240, and locks the PID file 241. In addition, the start control processing starts the communication processing section 252. When the communication processing section 252 is started normally and the start processing of the REST daemon section 250 is thereby completed, the locking of the PID file 241 is released. In addition, the locking of the PID file 241 is released also when the communication processing section 252 is not started normally and the start processing of the REST daemon section 250 is ended abnormally.

[Step S124] Using the process 1D and the port number read from the PID file 241, the backup managing section requests coupling from the communication processing section 252 of the REST daemon section 250.

[Step S125] When the backup managing section succeeds in establishing coupling to the REST daemon section 250, the backup managing section performs the processing of step S128. When the backup managing section fails in establishing the coupling, the backup managing section performs the processing of step S126.

[Step S126] The backup managing section checks the lock state of the PID file 241.

[Step S127] When the PID file 241 is locked, the backup managing section performs the processing of step S131 in FIG. 13. When the PID file 241 is not locked, on the other hand, the backup managing section advances the processing to step S123, and starts the REST daemon section 250.

[Step S128] Using the process 1D and the port number read from the PID file 241, the backup managing section requests data transmission from the communication processing section 252 of the REST daemon section 250. In response to the data transmission request, the communication processing section 252 transmits a REST API request to the storage server 110.

The description will be continued in the following with reference to FIG. 13.

[Step S131] The backup managing section is set in a waiting state for a certain time.

[Step S132] The backup managing section checks the lock state of the PID file 241.

[Step S133] When the PID file 241 is locked, the backup managing section advances the processing to step S131, and is set in the waiting state again. When the PID file 241 is not locked, for example, when the backup managing section detects that the lock is released, on the other hand, the backup managing section advances the processing to step S124 in FIG. 12, and requests coupling from the REST daemon section 250.

Incidentally, in the case where the PID file 241 is locked by the above-described "tryLock" method, the checking of the lock state in steps S126 and S132 is performed by the backup managing section by calling the "tryLock" method. When the PID file 241 is locked ("Yes" in steps S127 and S133), a given value indicating that the PID file 241 is locked is returned. When the PID file 241 is not locked ("No" in steps S127 and S133), on the other hand, the PID file 241 is locked by calling the "tryLock" method. Therefore, the backup managing section releases the lock by calling the "release" method, and thereafter performs the following processing (steps S123 and S124, respectively).

According to the above processing of FIG. 12 and FIG. 13, the backup managing section may perform correct subsequent processing corresponding to the state of the REST daemon section 250 according to the presence or absence of the PID file 241, whether or not coupling to the REST daemon section 250 is possible, and the lock state of the PID file 241.

For example, when the backup managing section determines that the PID file 241 is not present ("No" in step S122), the backup managing section may correctly determine that the REST daemon section 250 is not started (start processing is not performed). In this case, the backup managing section may continue processing for communicating with the storage server 110 by starting the REST daemon section 250 (step S123).

In addition, when the PID file 241 is present (step S122), but it is difficult to couple to the REST daemon section 250 ("No" in step S125), the backup managing section checks the lock state of the PID file 241 (step S126). Then, when the PID file 241 is not locked ("No" in step S127), the backup managing section may correctly determine that the start processing of the REST daemon section 250 is ended abnormally. In this case, the backup managing section may continue processing for communicating with the storage server 110 by starting the REST daemon section 250 (step S123).

In addition, when it is difficult to couple to the REST daemon section 250 ("No" in step S125) and the PID file 241 is locked ("Yes" in step S127), the backup managing section may correctly determine that the start processing of the REST daemon section 250 is being performed normally. In this case, the backup managing section is set in a waiting state until the start processing is completed (steps S131 to S133). When the backup managing section then detects completion of the start processing based on a lock release ("No" in step S133), the backup managing section may continue processing for communicating with the storage server 110 by coupling to the REST daemon section 250 using the PID file 241 (step S124).

Incidentally, when the start processing of the REST daemon section 250 is ended abnormally while the backup managing section is in the waiting state, the backup managing section detects a lock release ("No" in step S133), and requests coupling from the REST daemon section 250 (step S124). However, the backup managing section falls in establishing the coupling. In this case, the backup managing section may recognize that the start processing of the REST daemon section 250 is ended abnormally by determining that the PID file is not locked ("No" in step S127). The backup managing section may continue processing for communicating with the storage server 110 by starting the REST daemon section 250 (step S123).

Thus, the backup managing section may correctly recognize the state of the REST daemon section 250, and perform correct subsequent processing for performing data transmission to the storage server 110 based on a result of the recognition. It is thereby possible to reduce a probability of occurrence of an error due to the operation of the REST daemon section 250 rather than an error of the backup managing section itself during the processing of the backup managing section in response to a request from the user side. Hence, it is possible to stabilize the processing of the backup managing section in a case where the user side is not aware that the REST daemon section 250 intervenes in communication with the storage server 110. Then, the quality and convenience of an application program implementing such a backup managing section may be improved.

Incidentally, in the second embodiment described above, a case has been illustrated in which the two backup managing sections 220 and 230 share one REST daemon section 250. However, even in a case where three or more backup managing sections share one REST daemon section 250, for example, it suffices for each of the backup managing sections to perform processing similar to that of the backup managing sections 220 and 230 described above.

In addition, the processing functions of devices illustrated in each of the foregoing embodiments (for example, the information processing device 10 and the business servers 200, 200*a*, and 200*b*) may be implemented by a computer. In that case, the above-described processing functions are implemented on the computer by providing a program describing the processing contents of the functions to be possessed by each device, and executing the program on the computer. The program describing the processing contents may be recorded on a recording medium readable by the computer. The recording medium readable by the computer includes a magnetic storage device, an optical disk, a magneto-optical recording medium, a semiconductor memory, and the like. The magnetic storage device includes a hard disk device (HDD), a magnetic tape, and the like. The optical disk includes a compact disc (CD), a digital versatile disc (DVD), a Blu-ray disc (BD) (registered trademark), and the like. The magneto-optical recording medium includes a magneto-optical disk (MO) and the like.

In a case where the program is distributed, a portable recording medium such as a DVD, a CD, or the like on which the program is recorded, for example, is sold. In addition, it is possible to store the program in a storage device of a server computer in advance, and transfer the program from the server computer to another computer via a network.

The computer that executes the program, for example, stores the program recorded on the portable recording medium or the program transferred from the server computer in a storage device of the computer itself. Then, the computer reads the program from the storage device of the computer itself, and performs processing according to the program. Incidentally, the computer may also read the program directly from the portable recording medium, and perform the processing according to the program. In addition, each time the program is transferred from the server computer coupled to the computer via the network, the computer may sequentially perform the processing according to the program received.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and the processor configured to:
perform a first process configured to:
generate control data used in communication and storing the generated control data in a locked state in the memory while performing start processing of the first process,
release the locked state of the control data stored in the memory in response to completion of the start processing or suspension of the start processing, and
communicate with a communication device in response to a communication request after the completion of the start processing, and
perform a second process configured to:
determine, based on the control data, whether connection with the first process is established,
when it is determined that the connection with the first process is not established, select, from processing group, processing for connecting with the first process in accordance with whether the control data in the memory is locked, and
transmit the communication request to the first process while connecting with the first process based on the selected processing.

2. The information processing device according to claim 1, wherein
the selected processing is restarting the first process when the control data is not locked, and
the selected processing is waiting until the locked state of the control data is released when the control data is locked.

3. The information processing device according to claim 1, wherein the second process is further configured to transmit the communication request to the first process when it is determined that the connection with the first process is established.

4. The information processing device according to claim 1, wherein
the processor is configured to perform a plurality of second processes,
the first process is shared by the plurality of second processes, and
each of the plurality of second processes is configured to:
determine whether the control data is present in the memory, and
cause the first process to execute the start processing of the first process when it is determined that the control data is not present.

5. A computer-implemented information processing method comprising:
performing a first process configured to:
generate control data used in communication and storing the generated control data in a locked state in a memory while performing start processing of the first process,
release the locked state of the control data stored in the memory in response to completion of the start processing or suspension of the start processing, and
communicate with a communication device in response to a communication request after the completion of the start processing; and
performing a second process configured to:
determine, based on the control data, whether connection with the first process is established,
when it is determined that the connection with the first process is not established, select, from processing group, processing for connecting with the first process in accordance with whether the control data in the memory is locked, and
transmit the communication request to the first process while connecting with the first process based on the selected processing.

6. The information processing method according to claim 5, wherein
the selected processing is restarting the first process when the control data is not locked, and
the selected processing is waiting until the locked state of the control data is released when the control data is locked.

7. The information processing method according to claim 5, wherein the second process is further configured to transmit the communication request to the first process when it is determined that the connection with the first process is established.

8. The information processing method according to claim 5, further comprising:
performing another second process wherein
the first process is shared by both of the second process and the other second process, and
each of the second process and the other second process is configured to:
determine whether the control data is present in the memory, and
cause the first process to execute the start processing of the first process when it is determined that the control data is not present.

9. A non-transitory computer-readable medium storing a program executable by one or more computers, the program comprising:
one or more instructions for performing a first process configured to:
generate control data used in communication and storing the generated control data in a locked state in a memory while performing start processing of the first process,
release the locked state of the control data stored in the memory in response to completion of the start processing or suspension of the start processing, and
communicate with a communication device in response to a communication request after the completion of the start processing; and
one or more instructions for performing a second process configured to:
determine, based on the control data, whether connection with the first process is established,
when it is determined that the connection with the first process is not established, select, from processing group, processing for connecting with the first process in accordance with whether the control data in the memory is locked, and transmit the communication request to the first process while connecting with the first process based on the selected processing.

\* \* \* \* \*